US012634225B2

(12) United States Patent
Guo et al.

(10) Patent No.: US 12,634,225 B2
(45) Date of Patent: May 19, 2026

(54) MOVEABLE IP BASED NETWORK RESILIENCE

(71) Applicant: Telefonaktiebolaget LM Ericsson (publ), Stockholm (SE)

(72) Inventors: Liangliang Guo, Shanghai (CN); Yiming Wu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 18/700,252

(22) PCT Filed: Oct. 22, 2021

(86) PCT No.: PCT/CN2021/125652
§ 371 (c)(1),
(2) Date: Apr. 10, 2024

(87) PCT Pub. No.: WO2023/065294
PCT Pub. Date: Apr. 27, 2023

(65) Prior Publication Data
US 2024/0422093 A1 Dec. 19, 2024

(51) Int. Cl.
*H04L 45/00* (2022.01)
*H04L 45/24* (2022.01)
(Continued)

(52) U.S. Cl.
CPC .............. *H04L 45/22* (2013.01); *H04L 45/24* (2013.01); *H04L 45/74* (2013.01); *H04L 47/125* (2013.01); *H04L 61/5076* (2022.05)

(58) Field of Classification Search
CPC ..... H04L 45/22; H04L 61/5076; H04L 45/24; H04L 45/74; H04L 47/125
See application file for complete search history.

(56) References Cited

U.S. PATENT DOCUMENTS

| | | | |
|---|---|---|---|
| 2020/0127937 A1 | 4/2020 | Busick et al. | |
| 2020/0162421 A1* | 5/2020 | Lo ....................... | H04L 67/1001 |

(Continued)

FOREIGN PATENT DOCUMENTS

| | | |
|---|---|---|
| CN | 101052047 A | 10/2007 |
| CN | 102932500 A | 2/2013 |

(Continued)

OTHER PUBLICATIONS

Author Unknown, "Assign multiple IP addresses to virtual machines using the Azure portal," Microsoft Learn Article, Nov. 30, 2016, Microsoft, 9 pages.

(Continued)

*Primary Examiner* — Suraj M Joshi
(74) *Attorney, Agent, or Firm* — Withrow & Terranova, PLLC

(57) ABSTRACT

A network node and a method for moveable IP based network resilience. A method at a first network node for IP address management in a network that is not capable to perform load balance with L3 or below information only comprises: determining whether a second network node, to which a first IP address is allocated, fails to function or not; and in response to determining that the second network node fails to function, de-allocating the first IP address from the second network node; and allocating the first IP address to a third network node, such that a fourth network node is enabled to route data, which is intended to be routed to the first IP address, to the third network node rather than the second network node.

19 Claims, 9 Drawing Sheets

(51) Int. Cl.
_H04L 45/74_     (2022.01)
_H04L 47/125_     (2022.01)
_H04L 61/5076_     (2022.01)

(56)          References Cited

U.S. PATENT DOCUMENTS

2021/0315030 A1*  10/2021  Teyeb ................. H04L 61/5076
2021/0328858 A1*  10/2021  Asveren ............. H04L 61/5007

FOREIGN PATENT DOCUMENTS

| CN | 108923992 A | 11/2018 |
| JP | 2012090180 A | 5/2012 |

OTHER PUBLICATIONS

Author Unknown, "Elastic network interfaces," Amazon Elastic Compute Cloud: User Guide for Linux Instances, 2021, Amazon Web Services, Inc., 25 pages.
Author Unknown, "Using multiple IP addresses," Migrate for Compute Engine, Google Guides, Sep. 3, 2021, Google LLC, 4 pages.
Stewart, "Stream Control Transmission Protocol," Request for Comments 4960, Sep. 2007, Internet Engineering Task Force, 152 pages.
International Search Report and Written Opinion for International Patent Application No. PCT/CN2021/125652, mailed Mar. 18, 2022, 9 pages.
Author Unknown, "Scalingbits: IP Address Failover for highly available AWS Services," web.archive.org/web/20190202163854/ http://www.scalingbits.com/aws/ipfailover, Feb. 2, 2019, 1 page.
Chormale, Rohit, "AWS Simple Failover Setup using Elastic IP," laymanclass.com/aws-simple-failover-setup-using-elastic-ip/, Mar. 5, 2020, LaymanClass, 8 pages.
Extended European Search Report for European Patent Application No. 21961042.5, mailed Apr. 1, 2025, 9 pages.

* cited by examiner

NEF
130

NRF
135

AUSF
140

UDM
145

PCF
150

NSSF
155

SEPP
160

Nnef

Nnrf

Nausf

Nudm

Npcf

Nnssf

Nsepp

Namf

Nsmf

AMF
110

SMF/
PGW-C
115

N40

CHF
165

N1

N2

S5-C

N5

AF
125

N4

4G
RAN
107

S1-MME

S1-U

EPC
109

S5-U

UPF/
PGW-U
120

Data Network
(e.g., operator
or Internet)
170

5G
RAN
105

N3

N6

10

UE
100

Network Node
1100

Determining
Module
1110

IP
Reallocation
Module
1120

Cloud Infrastructure
300

Virtual Network 192.168.0.0/16
310

NF
320
VIP
11.11.100.6

Worker Node/Host X
321 backend
322 frontend
323

Frontend IP
192.168.5.10

Worker Node/Host Y
325 backend
326 frontend
327

Frontend IP
192.168.5.11

Load Balancing

DC-GW
340

DC-GW
345

Clients
350

900

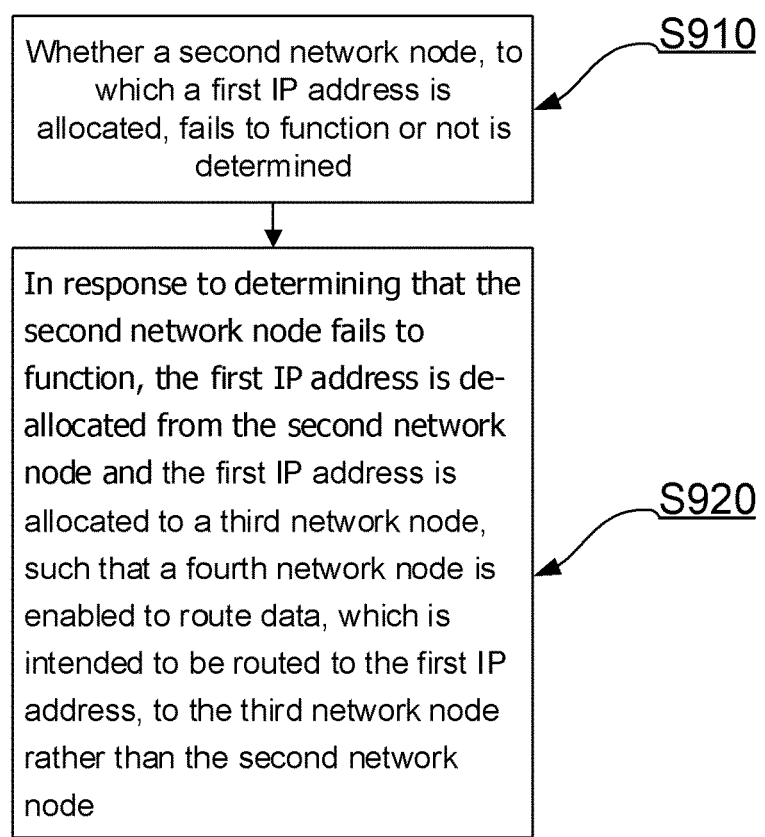

Whether a second network node, to which a first IP address is allocated, fails to function or not is determined — S910

In response to determining that the second network node fails to function, the first IP address is de-allocated from the second network node and the first IP address is allocated to a third network node, such that a fourth network node is enabled to route data, which is intended to be routed to the first IP address, to the third network node rather than the second network node — S920

FIG. 9

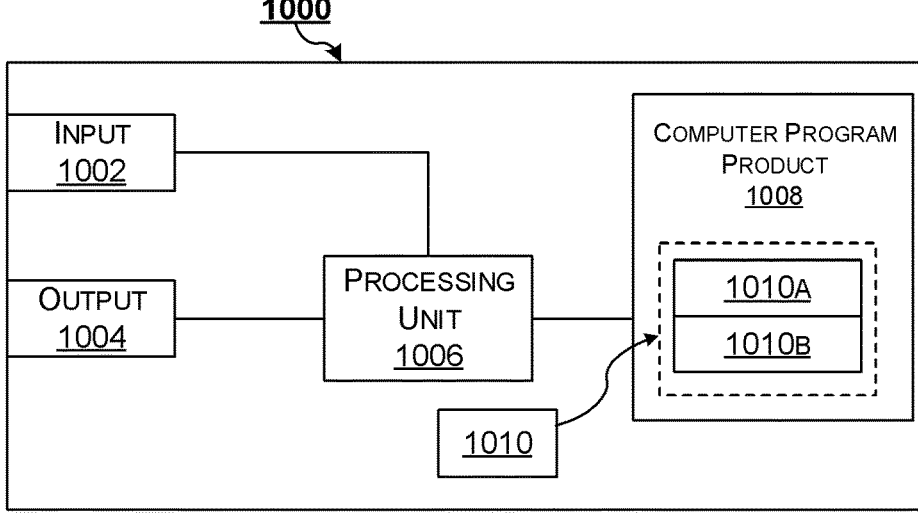

1000

INPUT 1002

OUTPUT 1004

PROCESSING UNIT 1006

COMPUTER PROGRAM PRODUCT 1008

MOVEABLE IP BASED NETWORK RESILIENCE

This application is a 35 U.S.C. § 371 national phase filing of International Application No. PCT/CN2021/125652, filed Oct. 22, 2021, the disclosure of which is incorporated herein by reference in its entirety.

TECHNICAL FIELD

The present disclosure is related to the field of telecommunication, and in particular, to a network node and a method for moveable IP based network resilience.

BACKGROUND

With the development of the electronic and telecommunications technologies, mobile devices, such as mobile phones, smart phones, laptops, tablets, vehicle mounted devices, become an important part of our daily lives. To serve a numerous number of mobile devices in an uninterrupted manner, Radio Access Network (RAN) and Core Network (CN) with high resilience and availability, such as a fifth generation (5G) New Radio (NR) RAN and 5G Core (5GC), will be required.

In the recent years, reports of network outages have become a regular occurrence. Companies have all recently reported outages that impacted millions for hours while the issues were resolved. For many companies, the cost of downtime is expensive and damaging to their reputations. When a telecommunications network is unavailable, employees, customers, and the organization as a whole are forced to face the resulting consequences.

When an outage occurs, employees' production has to halt. Even when the outage is finally resolved, it takes a company an average of 23 minutes to refocus on work, resulting in the company losing money due to lack of productivity. Customers who depend on an organization's platform cannot access certain features or services, which impacts both their business and personal lives. Beyond these frustrations, customers' data security is put at risk during a network outage.

Outages can stem from a variety of factors, including human error, environmental conditions and network elements, from Internet Service Provider (ISP) carrier issues to fiber cuts and cable interconnects. Additionally, as network devices become more complex and require frequent updates, they become more susceptible to bugs, exploits and cyberattacks, all of which contribute to outages.

Therefore, organizations need a robust, secure, and resilient network to ensure systems remain in place and available and business is not interrupted in any way in the event of a network outage.

SUMMARY

According to a first aspect of the present disclosure, a method at a first network node for IP address management in a network that is not capable to perform load balance with Layer 3 (L3) or below information only is provided. The method comprises: determining whether a second network node, to which a first IP address is allocated, fails to function or not; and in response to determining that the second network node fails to function, de-allocating the first IP address from the second network node; and allocating the first IP address to a third network node, such that a fourth network node is enabled to route data, which is intended to be routed to the first IP address, to the third network node rather than the second network node.

In some embodiments, the step of determining whether the second network node fails to function or not comprises: performing a liveness detection of the second network node directly or through an Application Programming Interface (API) server. In some embodiments, before the step of allocating the first IP address to the third network node, the method further comprises: determining the third network node as the network node to which the first IP address is to be relocated. In some embodiments, the step of de-allocating the first IP address from the second network node comprises: invoking an API of the network to de-allocate the first IP address from a virtual machine (VM) or host of the network at which the first IP address is hosted. In some embodiments, the step of allocating the first IP address to the third network node comprises: invoking the API of the network to allocate the first IP address to a VM or host of the network at which the third network node is hosted, such that traffic can be routed to the third network node using the first IP address.

In some embodiments, after the step of allocating the first IP address to the third network node, the method further comprises: transmitting, to the third network node, a message instructing the third network node to provide a routing service at the first IP address. In some embodiments, before the step of determining whether the second network node fails to function or not, the method further comprises: determining that an IP address is to be allocated at least partially based on a local configuration. In some embodiments, before the step of determining whether the second network node fails to function or not, the method further comprises: invoking the API of the network to allocate the first IP address to a VM or host of the network at which the second network node is hosted in response to determining that an IP address is to be allocated. In some embodiments, before the step of determining whether the second network node fails to function or not, the method further comprises: transmitting, to the second network node, a message instructing the second network node to provide a routing service at the first IP address.

In some embodiments, the method further comprises: invoking the API of the network to allocate a second IP address different from the first IP address to a VM or host of the network at which a fifth network node is hosted in response to determining that an IP address is to be allocated. In some embodiments, the method further comprises: transmitting, to the fifth network node, a message instructing the fifth network node to provide a routing service at the second IP address. In some embodiments, a multi-homing connection comprises a first path and a second path at least, wherein data delivered over the first path is routed via the first IP address, and data delivered over the second path is routed via the second IP address. In some embodiments, the multi-homing connection comprises a Stream Control Transmission Protocol (SCTP) association. In some embodiments, the first path is a primary path of the SCTP association, and the second path is a secondary path of the SCTP association.

In some embodiments, the SCTP association further comprises one or more other paths than the first path and the second path for data delivery. In some embodiments, the second network node, the third network node, and/or the fifth network node are hosted by the network. In some embodiments, any two of the second network node, the third network node, and the fifth network node are hosted at separate physical devices. In some embodiments, each of the second network node, the third network node, and the fifth network node is a frontend entity that forwards data to at least one of one or more backend entities in a load balancing manner. In some embodiments, the one or more backend entities and the frontend entities are deployed as a part of one or more network entities.

In some embodiments, the network entities comprise at least one of: one or more 5GC network functions, one or more Evolved Packet Core (EPC) network elements, one or more RAN nodes; one or more Operation & Administration Maintenance (OAM) nodes; and one or more testing network functions. In some embodiments, the network entities comprise an Access & Mobility Management Function (AMF), and the data comes from one or more RAN nodes.

In some embodiments, each of the frontend entities is an SCTP load balancer, and each of the backend entities is an SCTP endpoint that terminates one or more SCTP associations with one or more RAN nodes. In some embodiments, the network is a public cloud.

According to a second aspect of the present disclosure, a network node is provided. The network node comprises a processor and a memory storing instructions which, when executed by the processor, cause the processor to perform the method of the first aspect.

According to a third aspect of the present disclosure, a computer program comprising instructions is provided. The instructions, when executed by at least one processor, cause the at least one processor to carry out the method of the first aspect.

According to a fourth aspect of the present disclosure, a carrier containing the computer program of the third aspect is provided. The carrier is one of an electronic signal, optical signal, radio signal, or computer readable storage medium.

According to a fifth aspect of the present disclosure, a telecommunications system is provided. The telecommunications system comprises a network node of the second aspect.

BRIEF DESCRIPTION OF THE DRAWINGS

FIG. 9 is a flow chart illustrating an exemplary method at a network node for managing IP addresses according to an embodiment of the present disclosure.

FIG. 10 schematically shows an embodiment of an arrangement which may be used in a network node according to an embodiment of the present disclosure.

DETAILED DESCRIPTION

Figures 1, 11:
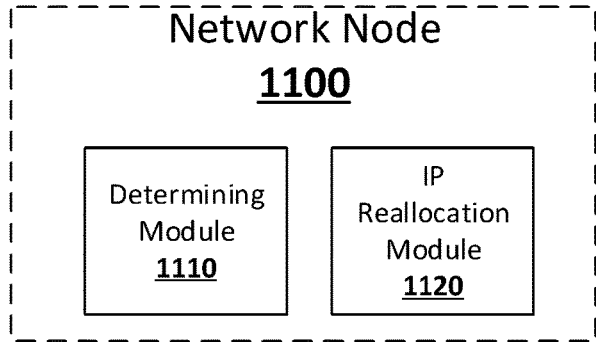
FIG. 1 is a diagram illustrating an exemplary telecommunications network in which moveable IP based network resilience according to an embodiment of the present disclosure may be applicable.
FIG. 11 is a block diagram of an exemplary network node according to an embodiment of the present disclosure.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G NR, the present disclosure is not limited thereto. In fact, as long as network resilience is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5G NR, etc.

Therefore, one skilled in the arts could readily understand that the terms used herein may also refer to their equivalents in any other infrastructure. For example, the term "User Equipment" or "UE" used herein may refer to a terminal device, a mobile device, a mobile terminal, a mobile station, a user device, a user terminal, a wireless device, a wireless terminal, or any other equivalents. For another example, the term "network node" used herein may refer to a network function, a network element, a RAN node, an OAM node, a testing network function, a transmission reception point (TRP), a base station, a base transceiver station, an access point, a hot spot, a NodeB, an Evolved NodeB (eNB), a gNB, a network element, or any other equivalents. Further, please note that the term "indicator" used herein may refer to a parameter, a coefficient, an attribute, a property, a setting, a configuration, a profile, an identifier, a field, one or more bits/octets, an information element, or any data by which information of interest may be indicated directly or indirectly.

Please note that the terms "IP" and "IP address" may be used interchangeably hereinafter when no confusion is caused.

FIG. 1 is a block diagram illustrating an exemplary telecommunications network 10 in which moveable IP based network resilience according to an embodiment of the present disclosure may be applicable. Although the telecommunications network 10 is a Non-Standalone (NSA) 5G network or a 4G/5G hybrid network, the present disclosure is not limited thereto. In some other embodiments, the telecommunications network 10 may be a Standalone (SA) 5G network, a 4G network, or a network complying with another telecommunications standard.

As shown in FIG. 1, the network 10 may comprise one or more UEs 100 and one or more RAN nodes 105/107, which could be base stations, NodeBs, evolved NodeBs (eNBs), gNBs, or AN nodes that provide the UEs 100 with access to other parts of the network 10. Further, the network 10 may comprise its core network portion comprising (but not limited to) an AMF 110, a Session Management Function (SMF)/Packet Data Network (PDN) Gateway-Control Plane (PGW-C) 115, a User Plane Function (UPF)/PGW-User Plane (PGW-U) 120, an Application Function (AF) 125, a Network Exposure Function (NEF) 130, a Network Repository Function (NRF) 135, an Authentication Server Function (AUSF) 140, a Unified Data Management (UDM) 145, a Policy Control Function (PCF) 150, a Network Slice Selection Function (NSSF) 155, a Security Edge Protection Proxy (SEPP) 160, and/or a Charging Function (CHF) 165. Further, the network 10 may further comprise one or more EPC nodes 109 for processing data from/to UEs 100 via the 4G RAN node 107 and for communicating with other network functions in 5GC for NSA operations. As shown in FIG. 1, these entities may communicate with each other via the service-based interfaces (SBI), such as, Namf, Nsmf, Npcf, etc. and/or the reference points or Non-SBI, such as, N1, N2, N3, N4, N5, N6, S1-MME, S1-U, etc.

However, the present disclosure is not limited thereto. In some other embodiments, the network 10 may comprise additional network functions/elements, less network functions/elements, or some variants of the existing network functions/elements shown in FIG. 1. For example, in a network with the 4G architecture, the entities which perform these functions (e.g., mobility management entity (MME)) may be different from those shown in FIG. 1 (e.g., the AMF 110). For another example, in a network with a pure 5G or 5G SA architecture, some of the entities may be same as those shown in FIG. 1, and others may be different. Further, the functions shown in FIG. 1 are not essential to the embodiments of the present disclosure. In other words, some of them may be missing from some embodiments of the present disclosure.

Here, some of the functions shown in FIG. 1, such as AMF 110, SMF/PGW-C 115, UPF/PGW-U 120, which may be involved in some embodiments of the present disclosure will be described in detail below.

Referring to FIG. 1, the AMF 110 may provide most of the functions that the MME provides in a 4G network as mentioned above. Below please find a brief list of some of its functions:

Terminates the RAN Control Plane interface (N2);

Non-access stratum (NAS) signalling;

NAS ciphering and integrity protection;

Mobility Management (MM) layer NAS termination;

Session Management (SM) layer NAS forwarding;

Authenticates UE;

Manages the security context;

Registration management;

Connection management;

Reachability management;

Mobility Management; and

Apply mobility related policies from PCF (e.g. mobility restrictions).

Further, the SMF/PGW-C 115 may provide the session management functions. Below please find a brief list of some of its functions:

Allocates IP addresses to UEs;

NAS signalling for SM;

Sends Quality of Service (QOS) and policy information to RAN via the AMF;

Downlink data notification;

Select and control UPF for traffic routing;

Acts as the interface for all communication related to offered user plane services; and Lawful intercept-control plane.

Further, the UPF/PGW-U 120 may perform the following functions:

Packet routing and forwarding

Packet inspection and QoS handling, and the UPF may optionally integrate a Deep Packet Inspection (DPI) for packet inspection and classification;

Connecting to the Internet POP (Point of Presence), and the UPF may optionally integrate the Firewall and Network Address Translation (NAT) functions;

Mobility anchor for Intra RAT and Inter-RAT handovers;

Lawful intercept-user plane; and

Maintains and reports traffic statistics.

As shown in FIG. 1, the UPF/PGW-U 120 are communicatively connected to a Data Network (DN) 170 which may be, or in turn communicatively connected to, the Internet, such that the UEs 100 may finally communicate its user plane data with other devices outside the network 10, for example, via the RAN 105/107 and the UPFs 120.

Figure 2:
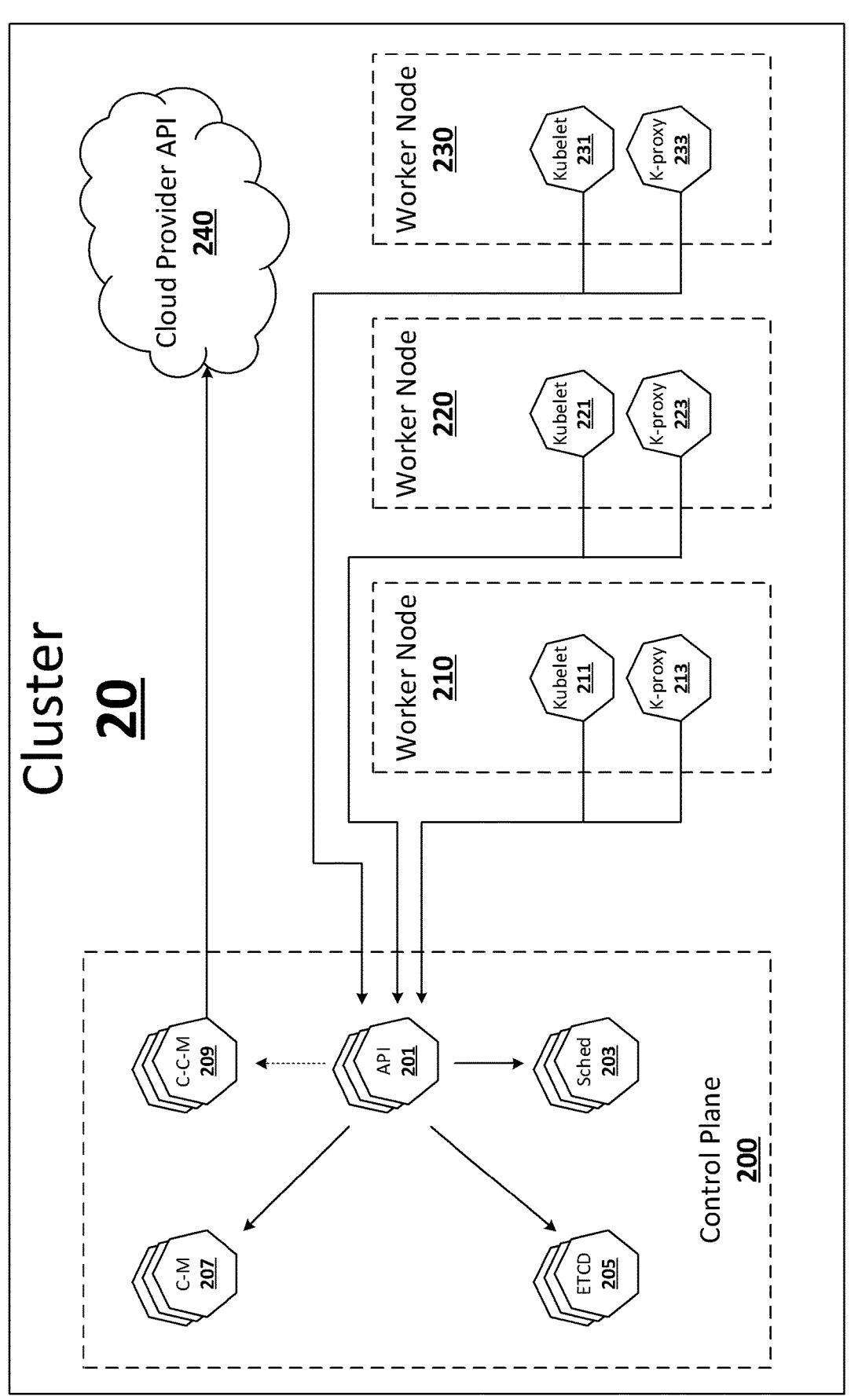
FIG. 2 is a diagram illustrating an exemplary platform for managing containerized workloads and services over which moveable IP based network resilience according to an embodiment of the present disclosure may be applicable.

FIG. 2 is a diagram illustrating an exemplary platform for managing containerized workloads and services over which moveable IP based network resilience according to an embodiment of the present disclosure may be applicable. Please note that although the embodiment shown in FIG. 2 is described in the context of Google Kubernetes (K8s), the present disclosure is not limited thereto. In some other embodiments, other container orchestration engines or VM management engines may be used.

Kubernetes is an open-source system for automating deployment, scaling, and management of containerized applications. It may group containers that make up an application into logical units for easy management and discovery.

As shown in FIG. 2, when Kubernetes is deployed, a cluster 20 may be obtained. The cluster 20 may consist of a set of worker machines, called worker nodes (e.g., worker nodes 210, 220, 230 shown in FIG. 2), that may run containerized applications. Although three worker nodes 210, 220, and 230 are shown in FIG. 2, the present disclosure is not limited thereto. For example, a cluster may have at least one worker node.

The worker node(s) may host the Pods that are the components of the application workload. A control plane 200 may manage the worker nodes 210, 220, and 230 and the Pods in the cluster 20. In production environments, a control plane may usually run across multiple computers and a cluster usually runs multiple nodes, providing fault-tolerance and high availability.

Control Plane Components

The control plane 200's components may make global decisions about the cluster 20 (for example, scheduling), as well as detecting and responding to cluster events (for example, starting up a new pod when a deployment's replicas field is unsatisfied).

Control plane components can be run on any machine in the cluster 20. However, for simplicity, set up scripts may typically start all control plane components on a same machine, and do not run user containers on this machine.

API server (API)

The API server 201 may be a component of the Kubernetes control plane 200 that may expose the Kubernetes API. The API server 201 may be the front end for the Kubernetes control plane 200.

The main implementation of a Kubernetes API server is kube-apiserver. kube-apiserver is designed to scale horizontally—that is, it may scale by deploying more instances. Several instances of kube-apiserver may be run and traffic between those instances may be balanced.

ETCD

The ETCD 205 may be a consistent and highly-available key-value store used as Kubernetes' backing store for all cluster data.

Scheduler (Sched)

The scheduler 203 is a control plane component that watches for newly created Pods with no assigned node, and selects a node for them to run on. Factors taken into account for scheduling decisions may include: individual and collective resource requirements, hardware/software/policy constraints, affinity and anti-affinity specifications, data locality, inter-workload interference, and deadlines.

Controller-Manager (C-M)

The C-M 207 is a control plane component that runs controller processes. Logically, each controller may be a separate process, but to reduce complexity, they are all compiled into a single binary and run in a single process. Some types of these controllers may comprise at least one of:

Node controller: Responsible for noticing and responding when nodes go down.

Job controller: Watches for Job objects that represent one-off tasks, then creates Pods to run those tasks to completion.

Endpoints controller: Populates the Endpoints object (e.g., joins Services & Pods).

Service Account & Token controllers: Create default accounts and API access tokens for new namespaces.

Cloud-Controller-Manager (C-C-M)

The C-C-M 209 is a Kubernetes control plane component that embeds cloud-specific control logic. The cloud controller manager lets cluster owner or operator link the cluster 20 into the cloud provider's API, and separates out the components that interact with that cloud platform from components that only interact with the cluster 20. In some embodiments, the cloud provider API 240 may be an API provided by a third party, for example, Microsoft Azure, Amazon Web Services (AWS), or Google Cloud Platform (GCP).

The C-C-M 209 may only run controllers that are specific to the cloud provider. If Kubernetes is running on one's own premises, or in a learning environment inside one's own PC, the cluster 20 may not have a C-C-M. As with the C-M 207, the C-C-M 209 may combine several logically independent control loops into a single binary that is running as a single process. The C-C-M 209 can be scaled horizontally (run more than one copy) to improve performance or to help tolerate failures.

Node Components

Node components may run on every worker node 210, 220, or 230, maintaining running pods and providing the Kubernetes runtime environment.

Kubelet

The Kubelet (e.g., the Kubelet 211, 221, or 231 shown in FIG. 2) is an agent that runs on each worker node in the cluster 20. It may make sure that containers are running in a Pod. The kubelet 211, 221, or 231 may take a set of PodSpecs that are provided through various mechanisms and ensures that the containers described in those PodSpecs are running and healthy. The kubelet 211, 221, or 231 does not manage containers which were not created by Kubernetes.

Kube-Proxy (K-Proxy)

The Kube-proxy (e.g., the K-proxy 213, 223, or 233 shown in FIG. 2) is a network proxy that runs on each node in the cluster 20, implementing part of the Kubernetes Service concept. Kube-proxy may maintain network rules on nodes. These network rules may allow network communication to the Pods from network sessions inside or outside of the cluster 20. Kube-proxy 213, 223, or 233 may use the operating system packet filtering layer if there is one and it's available. Otherwise, kube-proxy 213, 223, or 233 may forward the traffic itself.

The cluster 20 may comprise other components than those described above, for example, container runtime, Domain Name Service (DNS), web user interface (UI), cluster-level logging, container resource monitoring, etc., which are not shown in FIG. 2 for simplicity and clarity. However, some embodiments of the present disclosure may involve one or more of them, and it is known to one skilled in the art how these components are involved in the embodiments even they are not described here.

The core of Kubernetes' control plane 200 is the API server 201. The API server 201 may expose a Hypertext Transfer Protocol (HTTP) API that lets end users, different parts of the cluster 20, and external components communicate with one another. The Kubernetes API may enable the operator of the cluster 20 to query and manipulate the state of API objects in Kubernetes (for example: Pods, Namespaces, ConfigMaps, and Events). Most operations can be performed through the kubectl command-line interface or other command-line tools, such as kubeadm, which in turn use the API. However, the API can also be accessed directly by using Representational State Transfer (REST) calls.

Kubernetes may run the workload by placing containers into Pods to run on Nodes (e.g., the worker nodes 210, 220, and 230). The worker node 210, 220, or 230 may be a virtual or physical machine, depending on the cluster 20. Each worker node may be managed by the control plane 200 and contain the services necessary to run Pods. Each container may be repeatable. Containers may decouple applications from underlying host infrastructure. This makes deployment easier in different cloud or Operating System (OS) environments.

With the cluster 20 shown in FIG. 2, a network (e.g., the telecommunications network 10 shown in FIG. 1) may be deployed in the cluster 20 or a cluster having more worker nodes.

In some embodiments, some of the network functions shown in FIG. 1 may be combined into a same entity. For example, the AMF 110, the SMF 115, and the control plane of the EPC 109 shown in FIG. 1 may be combined into a PCC. The PCC may be a cloud native function for processing control plane signalling in a dual-mode 5G Core offering. It may provide access, session, mobility and gateway control functions to support new 5G use-cases. In some embodiments, the PCC may be built using cloud native and Service Based Architecture technologies to deliver a flexible and efficient software product and plays a key role in the dual-mode 5G Core offering. In some embodiments, it may comply with 3GPP Release 15 specification or its subsequent releases, implementing the MME, Serving Gateway-Control Plane (SGW-C), PGW-C, AMF and SMF control plane network functions. With high-valued functions like reduced signalling, adaptive paging algorithms, as well as the capability to provide service continuation to subscribers during network disturbance and network assurance with software probes, it includes a complete feature-set for Mobile Broadband (MBB), Massive Internet of Things (IoT), Voice over LTE (VOLTE) and 5G NSA/SA. The PCC may work as a dual-mode 5G Core control plane for both EPC and 5GC to address the still growing 4G networks and to support the introduction of 5G. Total cost of ownership may be optimized thanks to flexible deployments and smooth evolution paths. Network efficiency and simplified operations may be achieved through unified O&M, high degree of automation, and In-Service Software Upgrade.

For another example, the UPF/PGW-U 120 and the user plane of the EPC 109 shown in FIG. 1 may be combined into a PCG. The PCG may be a cloud native function for user plane traffic processing and gateway in a dual-mode 5G Core offering. It may provide a massively scalable, flexible and efficient software product, aligned with the rest of the dual-mode 5G Core offering.

Further, Time to Market (ToM) has never been more important to be able to create new business opportunities and revenue streams. The PCC/PCG may be validated end-to-end with 5G NR allowing an operator to start building a programmable and use-case driven network. Together with supported evolution paths from EPC to 5G EPC and 5G Core, it may offer a fast, flexible, and smooth 5G introduction. Further, the PCC/PCG may introduce new tools, technologies, and features to support advanced levels of operational automation and programmability.

Continuous Integration and Continuous Deployment (CI/CD), in-service software upgrade, and life cycle orchestration in compliance with Open Network Automation Platform (ONAP) & European Telecommunications Standard Institute (ETSI) Management and Orchestration (MANO), provides new levels of operational efficiency. Machine learning, artificial intelligence together with advanced analytics will lead us towards the zero-touch vision of a fully automated network.

In some embodiments, a PCC may be an implementation of an AMF (e.g., the AMF 110) and SMF/PGW-C (e.g., the SMF/PGW-C 115) in a 5G core network, as shown in FIG. 1. For the SBI interface such as Namf, Nsmf in the PCC, a Transport Control Protocol (TCP) Load Balancer provided by a public cloud (e.g., a public cloud deployed based on the architecture shown in FIG. 2) can be used to attract external traffic into network functions in the SBI interface when the PCC is deployed in the public cloud.

Figure 3:
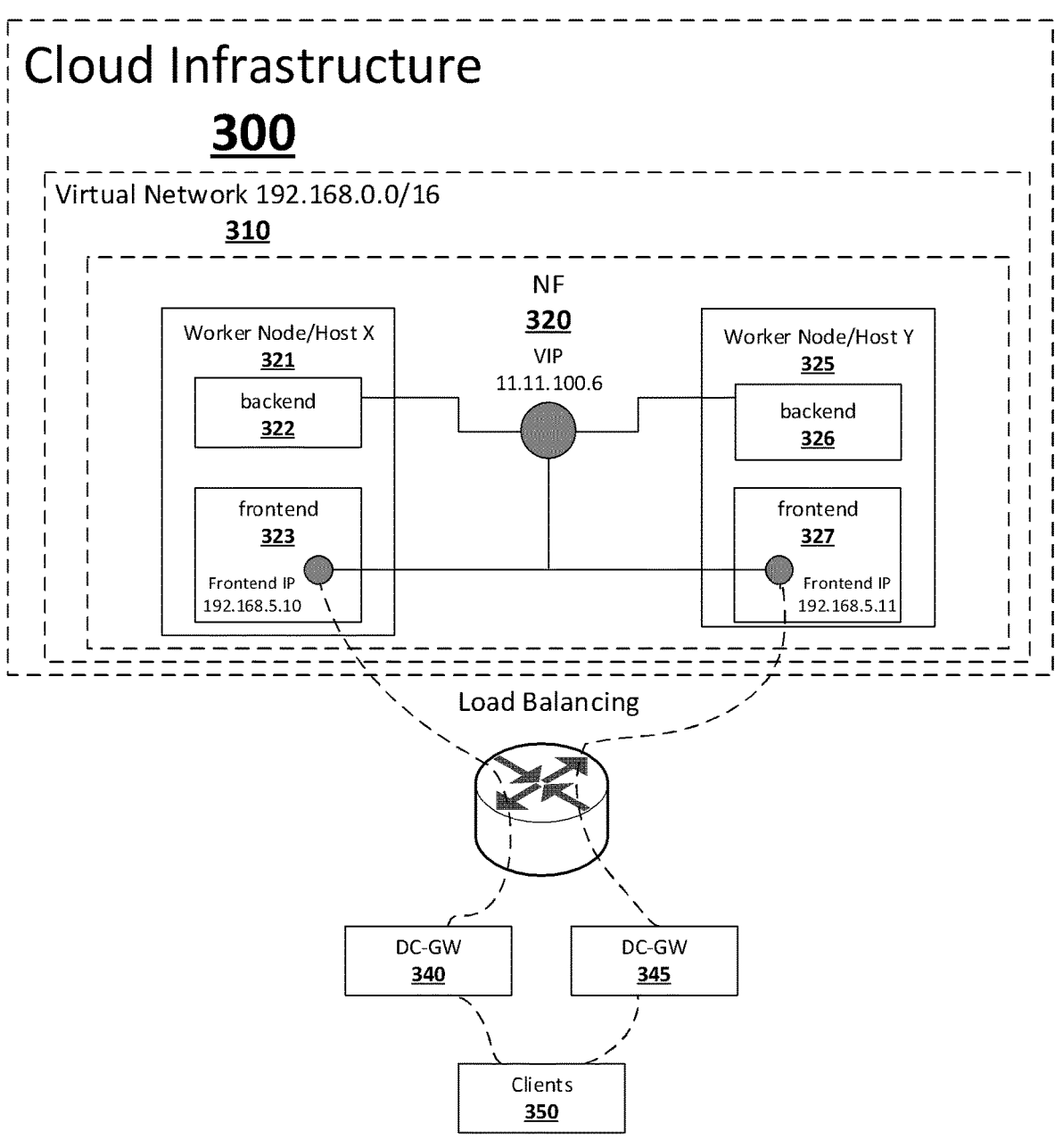
FIG. 3 is a diagram illustrating an exemplary scenario in which external traffic is attracted for non Service Based Interface (SBI) in a Packet Core Controller (PCC)/Packet Core Gateway (PCG) in which moveable IP based network resilience according to an embodiment of the present disclosure may be applicable.

For non SBI interface (e.g., N2, N3, N4, N6), User Datagram Protocol (UDP), SCTP, and a routing function (e.g., Equal-Cost Multi-Path (ECMP) routing) may be used to attract external traffic into multiple front-end IPs of a NF, for example, as shown in FIG. 3. FIG. 3 is a diagram illustrating an exemplary scenario in which external traffic is attracted for non-SBI in a PCC/PCG in which moveable IP based network resilience according to an embodiment of the present disclosure may be applicable.

As shown in FIG. 3, an NF 320 (e.g., a PCC or PCG) may be deployed in a virtual network 310 (e.g., a subnet 192.168.0.0/16) over a cloud infrastructure 300 (e.g., that is orchestrated or managed in a manner similar to that shown in FIG. 2). As shown in FIG. 3, the NF 320 may be assigned with a Virtual IP (VIP), 11.11.100.6 for communicating with clients 350. Further, multiple instances of the NF 320 may be deployed at multiple worker nodes 321 and 325 for redundancy and robustness. Each of the frontends 323 and 327 may be assigned with an IP address (e.g., 192.168.5.10 or 192.168.5.11) for actual data routing.

As also shown in FIG. 3, routing functions, such as a Data Centre Gateway (DC-GW) 340/345, may be used for distributed incoming traffic to multiple next hops with a same destination IP address. It may keep the source IP and destination VIP address when forwarding the data to multiple next hops. In some embodiments, when the routing function is used, L2 connectivity is required.

For example, as depicted in FIG. 3, the clients 350 may send their data to the VIP address 11.11.100.6 in the NF cluster 320 which consist of a pool of front-end entities 323/327 (Pod, VM, or process) and back-end entities 322/326 (Pod, VM, or process). The routing function, DC-GW, 340/345 may know that next hops to reach 11.11.100.6 are front end IPs-192.168.5.10 and/or 192.168.5.11, either by configuration or by exchanging routing information with the NF 320 by using dynamic routing protocol, such as Border Gateway Protocol (BGP), Open Shortest Path First (OSPF). The DC-GW 340/345 may route the traffic to the frontend IPs using round-robin or ECMP. The front-end entities 323/327 may distribute the traffic to the back-end entities 322/326 listening on the VIP 11.11.100.6. In the embodiment shown in FIG. 3, L2 information is needed for routing the data to the correct destination. In other words, the cloud infrastructure 300 shall provide L2 information to the frontends 323/327 at least, to make sure that the data can be correctly routed to the backend 322 or 326.

In some other embodiments where a network offers a load balancing (LB) function for some Layer 4 (L4) protocols, e.g. TCP, UDP, by a combination of IP (L3 information) and port (L4 information) to multiple backends, the network typically does not offer LB for IP level (L3 information) only, e.g. using a VIP to multiple backends. Since the load balance is in the packet path, its behaviour is tightly connected to the resilience, e.g. routing redundancy. For example an LB could redirect flow from a failed backend to other working backends for redundancy reason.

Figure 4:
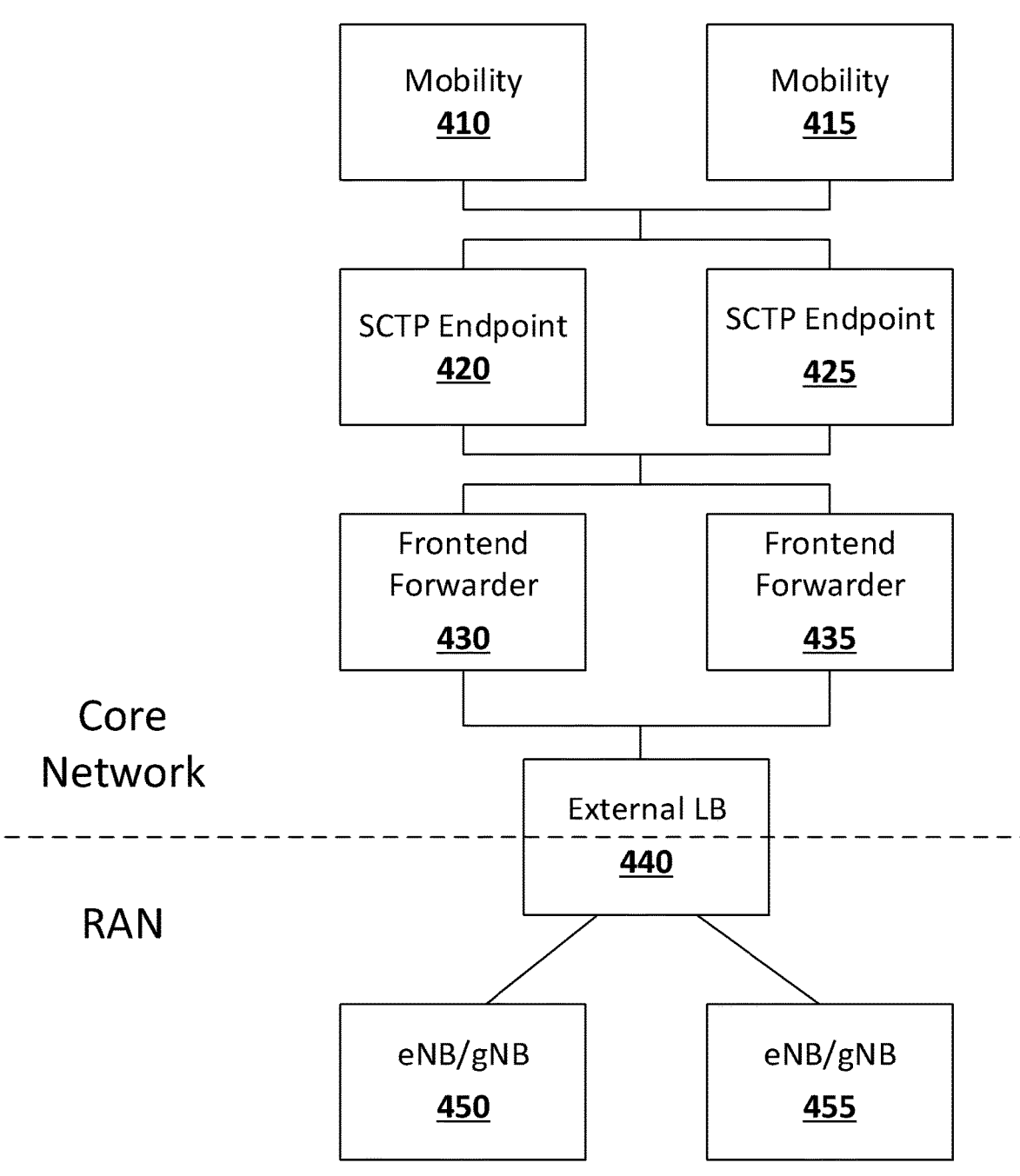
FIG. 4 is a diagram illustrating an exemplary scenario for load balancing with which moveable IP based network resilience according to an embodiment of the present disclosure may be applicable.

FIG. 4 is a diagram illustrating an exemplary scenario for load balancing with which moveable IP based network resilience according to an embodiment of the present disclosure may be applicable. As shown in FIG. 4, one or more RAN nodes (e.g., an eNB/gNB 450 and/or an eNB/gNB 455) may transmit data to one or more mobility modules 410/415 in an AMF (e.g., the AMF comprised in the NF/PCC shown in FIG. 3) via multiple levels of load balancing.

In the embodiment shown in FIG. 4, an external LB 440 may be an ECMP capable routing device who can distribute traffic destined to the AMF RAN interface IP frontend entities' IPs (e.g., IPs of frontend forwarders 430 and 435). Further, the frontend forwarders 430 and 435 may be responsible for receiving SCTP packets and forwarding the received packets to backend entities or SCTP endpoints 420 and 425. Each of the frontend forwarders 430 and 435 may select a backend entity for a new SCTP association setup in a load balancing way. The SCTP endpoints 420 and 425 may terminate an SCTP association. The mobility entities 410/415 may handle the business logic such as UE registration, UE session establishment upon receiving the requests received on top of the SCTP association.

A public cloud (e.g., GCP, Azure, AWS) may provide a virtual private cloud network, which is an environment that let an operator of the network launch cloud resources, and which is a logically isolated virtual network, such as Azure VNet, Google Kubernetes Engine (GKE) Virtual Private Cloud (VPC) network and AWS Virtual Private Cloud. The operator of the network may have complete control over the virtual networking environment, including selection of own IP address range, creation of subnets, and configuration of route tables and network gateways. However, the virtual network is a pure L3 overlay network where no L2 connectivity (to a routing device) and no equivalent routing capability (e.g., ECMP, OSPF, BGF) is provided. However, as described with reference to FIG. 3 and FIG. 4, these functions are required for non SBI interface VIP load balancing solution.

Figure 5:
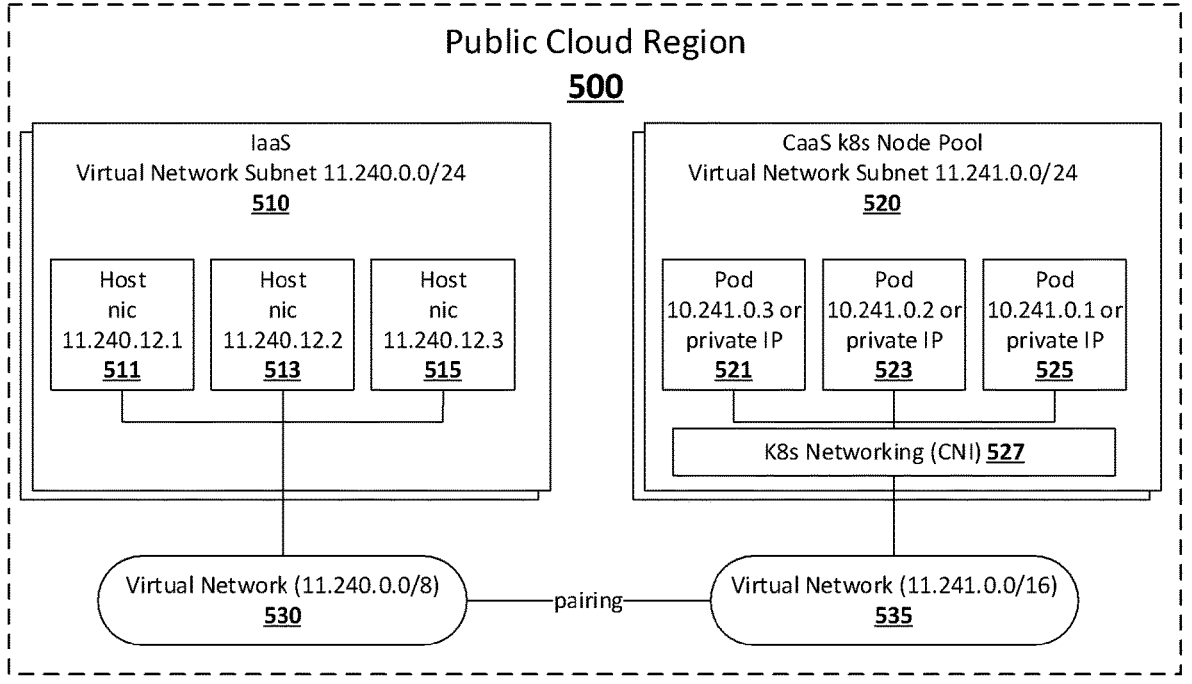
FIG. 5 is a diagram illustrating an exemplary public cloud in which moveable IP based network resilience according to an embodiment of the present disclosure may be applicable.

FIG. 5 is a diagram illustrating an exemplary public cloud in which moveable IP based network resilience according to an embodiment of the present disclosure may be applicable.

IP addresses must be allocated from a virtual network IP address space defined as IP subnets, in order to be routable inside the virtual network. For example, when K8s is used, it needs to have VPC address for attracting external traffic. For example, as shown in FIG. 5, virtual resources of a VM or a K8s work node may be allocated to connect to different virtual networks (e.g., the virtual network 530 and the virtual network 535). Therefore, the pod or VM can receive the traffic from the same virtual networks directly. As also shown in FIG. 5, pairing (that is, a configuration action to instruct Public Cloud provider to exchange virtual network IP packet among virtual networks) may be used to connect the two different virtual networks.

For IP address not within the virtual network subnets, such as K8s cluster internal IP addresses, either an overlay network on top of the virtual network or Network Address Translation (NAT) must be used to route the traffic.

Therefore, in a public cloud, at least one of following issues shall be addressed:

There is no L2 connectivity in a public cloud virtual network (or even in some other networks).

It is impossible to configure the routing function to forward packets to multiple next hops—that is the front-end IP address pools—with same destination IP addresses.

IP addresses that are not explicitly allocated from the virtual network are blocked by the infrastructure firewall or routing function.

Therefore, a mechanism for distributing external traffic to multiple next hops for non SBI interface, for example, as described with reference to FIG. 3, is not possible.

It is possible to set up a tunnel (that is to create an overlay on top of public cloud virtual network) to encapsulate the L2 traffic within the public cloud virtual network. In such a case, the existing ECMP based LB solution mentioned above can be used. However, this solution does not use the public cloud native function. In other words, this solution requires additional management of the tunnelling and requires additional virtual routing device. It also consumes additional computing resources for the tunnelling encryption and description handling.

Therefore, some embodiments of the present disclosure introduce a moveable IP management function which manages a resilient IP address of SCTP for attracting AMF SCTP traffic from RAN when the AMF is deployed in public cloud or in an environment that does not provide L2 connectivity and does not provide ECMP based routing.

A public cloud may allow a Network Interface Controller (NIC) in a VM to be assigned with multiple (additional) IP addresses. The moveable IP can be provided via calling the public cloud API by the moveable IP management function—that is calling API to create, allocate, deallocation and delete the same IP address to different VMs where the front-end entity of a NF stays. The IP address may be allocated from the virtual network address space which makes it routable within the public cloud virtual network. The moveable IP address may be attached to a front-end entity on a VM instance at the beginning and be re-attached to another front-end entity on another VM instance of the same AMF according to the availability of the initially attached front-end entity. That is, the IP address can be moved among different front-end entities based on availability of the front-end entities. Therefore, the resilience can be provided for the SCTP traffic from a RAN. However, the present disclosure is not limited thereto. In some other embodiments, the moveable IP management function may be deployed for other network functions/network elements, such as, SMF, UPF, PCC, PCG, RAN node, OAM node, or any other entity that requires a resilient deployment over a cloud or a network. Further, in some other embodiments, the moveable IP management function may be deployed for other type of data than the SCTP data, such as, TCP data, UDP data, or the like.

In other words, some embodiments of the present disclosure may provide a public cloud native (agonistic) SCTP resilience solution for incoming traffic where a moveable IP management function may provide a resilient IP address through cloud API for AMF SCTP RAN interface. The solution may have at least one of the following benefits:

Cloud platform agonistic-one common solution for all
        public cloud vendors without special requirements. As
        multiple IP address per interface and allocation/de-
        allocation of additional IP addresses to an interface are
        supported in all public cloud infrastructures, the
        mechanism can be used in all public cloud infrastruc-
        tures.
    Use Public Cloud native mechanism-no additional over-
        lay network or tunnelling is required, and therefore no
        capacity loss is caused by the overlay network or
        tunnelling.
    For cloud native deployment in Container as a Service
        (CaaS) such K8s, no K8s IP table is used for load
        balancing which improves worker node performance.

Figure 6:
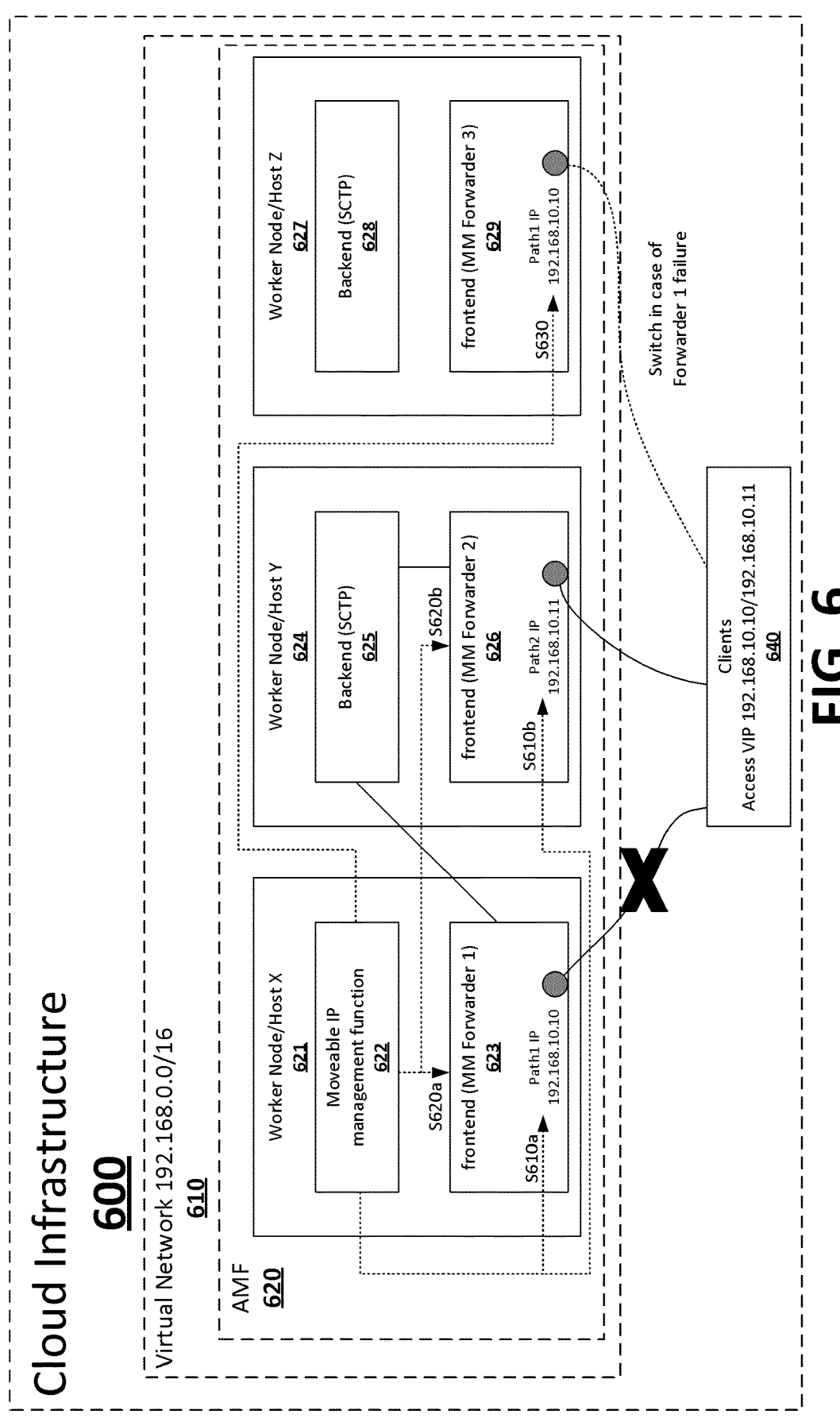
FIG. 6 is a diagram illustrating an exemplary system and procedure for moveable IP based network resilience according to an embodiment of the present disclosure.

FIG. 6 is a diagram illustrating an exemplary system and procedure for moveable IP based network resilience according to an embodiment of the present disclosure. As shown in FIG. 6, an AMF 620 may be deployed in a virtual network 610 (with a subnet 192.168.0.0/16) over a cloud infrastructure 600. Multiple instances of the AMF 620 may be deployed at multiple worker nodes/hosts 621, 624, and/or 627. One or more frontends (or MM forwarders) of the AMF 620 and one or more backends (or SCTP endpoints) of the AMF 620 may be deployed at multiple worker nodes/hosts 621, 624, and/or 627. In some embodiments, an MM forwarder may be a front-end entity which is responsible for forwarding SCTP packets to the backends or SCTP entities which terminate SCTP connections. In some embodiments, an SCTP may be a backend entity, and SCTP end points may be terminated by the SCTP entity (e.g., Pod). Further, a moveable IP management function 622 may be deployed at one of the worker nodes (e.g., the worker node 621), and it may be responsible for managing the lifecycle of a moveable IP in the cloud infrastructure, monitoring the liveness of the front-end entities and re-allocating (failing-over) the IP address to another front-end entity based on liveness detection result of frontend entities.

At step S610a: a moveable IP address 192.168.10.10 may be allocated to a front-end entity (i.e., MM Forwarder 1) 623 as the SCTP primary path IP address. At step S610b, another moveable IP address 192.168.10.11 may be allocated to another front-end entity (i.e., MM Forwarder 2) 626 as the SCTP secondary path IP address. In some embodiments, in order to avoid single failure of two paths of an SCTP association due to one front-end entity failure, the primary and secondary IP addresses may be allocated to different front-end entities by the moveable IP management function 622.

In some embodiments, for a K8s deployment, the IP may be either:

allocated to the primary network as secondary IP address
        for a Pod which is separated from the primary IP
        address where internal traffic can use; or
    allocated to the secondary Network for Pod to have better
        isolation from the internal IP address in the primary
        network.

At step S620a and S620b: the front-end entities may be monitored by the moveable IP management function 622 for their liveness.

At step S630: in case of the front-end entity MM Forwarder 1 which owns the primary path IP address, 192.168.10.10, fails, the RAN fails-over to the secondary path, for example, due to SCTP's redundancy mechanism. On the other hand, the moveable IP management function 620, upon detection of the failure, may call the cloud API to de-allocate the IP 192.168.10.10 from the worker node 621 and re-allocate the same IP to the worker node 627. In some embodiments, the worker node 627 may be selected because the front-entity (i.e., MM forwarder 3) thereon does not have an IP address bound to the affected SCTP association. The IP management function 622 may configure the IP 192.168.10.10 in the front-end entity (i.e., MM Forwarder 3) 629. The path of a front-end entity hosted by the worker node 627 may become the secondary path of the SCTP association. In other words, the redundancy of the moveable IP 192.168.10.10 may be restored when the broken worker node 621 is replaced by the worker node 627.

In some embodiments, similar procedures and functions may be applied for 192.168.10.11 in case MM Forwarder 2 fails. In some embodiments, the use of multi-homing of SCTP may be appreciated for fast fail-over as the public cloud API call to fail over IP to the VM owning another front-end entity cannot be guaranteed within a few seconds. Next, a detailed description of the procedure may be given with reference to FIG. 7 and FIG. 8.

Figure 7:
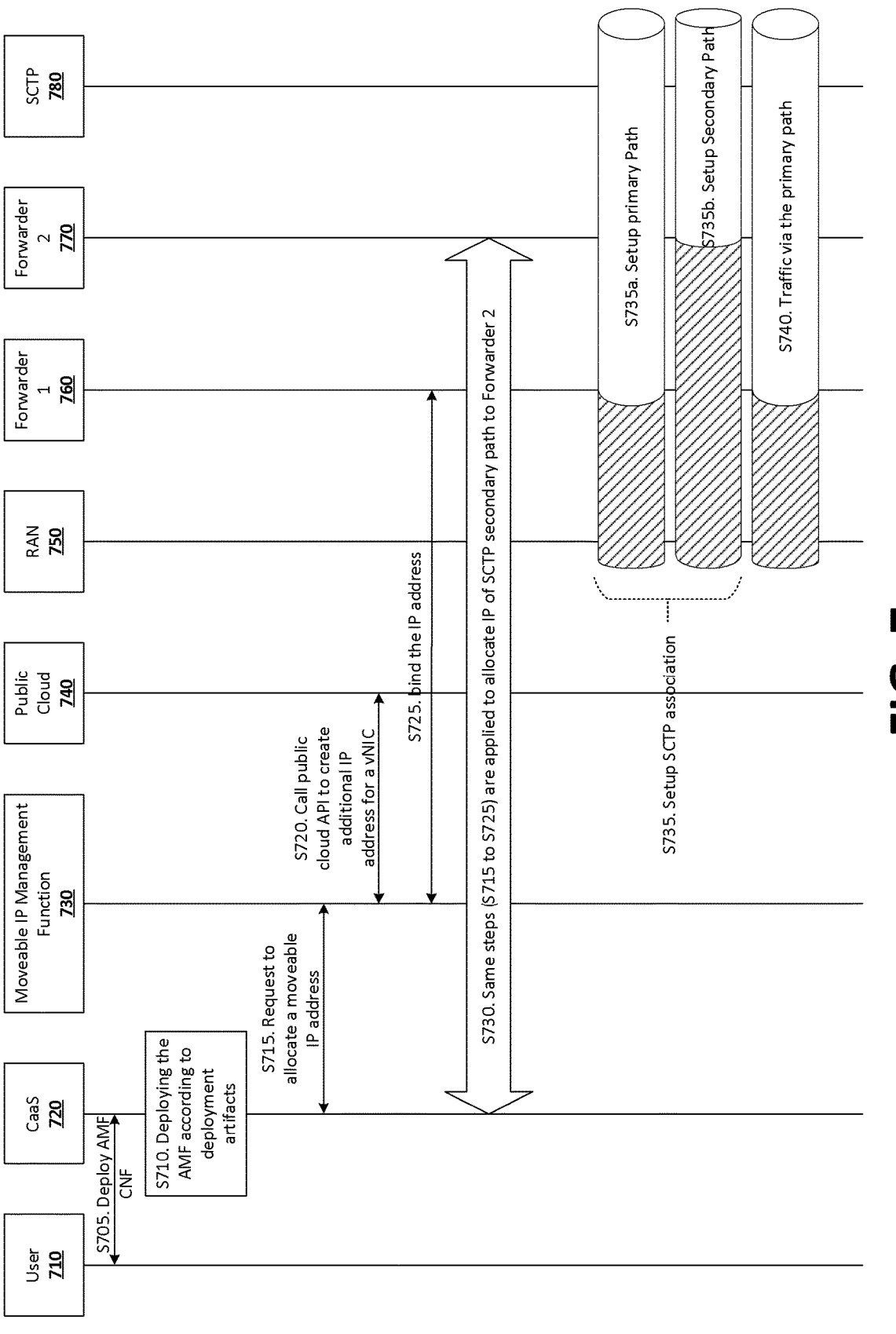
FIG. 7 is a diagram illustrating an exemplary procedure for managing moveable IP address when initialization according to an embodiment of the present disclosure.
Figure 8:
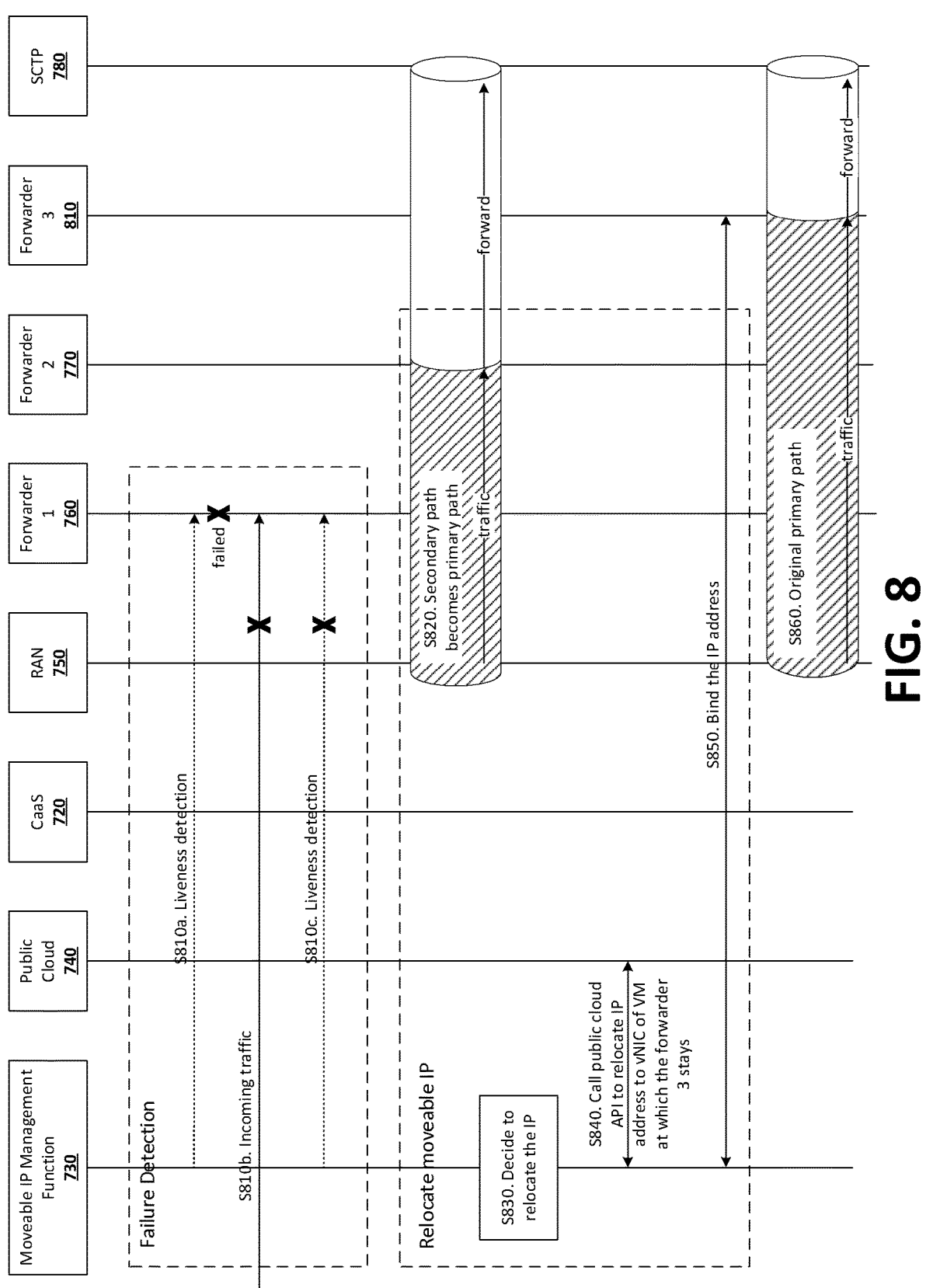
FIG. 8 is a diagram illustrating an exemplary procedure for managing moveable IP address when a failure is detected according to an embodiment of the present disclosure.

FIG. 7 is a diagram illustrating an exemplary procedure for managing moveable IP address when initialization according to an embodiment of the present disclosure, and FIG. 8 is a diagram illustrating an exemplary procedure for managing moveable IP address when a failure is detected according to an embodiment of the present disclosure. In some embodiments, some prerequisites may be needed for the procedures. For example, SCTP multiple homing configuration may be enabled. For another example, the system may be designed with anti-affinity rules that different multiple-homing IP addresses may be used by different frontend forwarding entities. In this example, a Forwarder 1 760 may host a primary end point (EP) IP of an SCTP association from RAN 750 while a Forwarder 2 770 may host a secondary EP IP of the SCTP association from RAN 750. However, the present disclosure is not limited thereto.

At step S705, a user 710 may deploy an AMF or another Core Network function e.g. using a deployment artifact, such as a helm chart. For example, the user 710 may deploy the AMF via a CaaS layer 720 (e.g., Kubernetes). At step S710, the CaaS layer 720 may deploy the AMF according to the deployment artifact.

At step S715, as a moveable IP is defined in the deployment, the CaaS layer 720 may call the moveable IP management function 730 which owns the lifecycle of a moveable IP to allocate a moveable IP. In some other embodiments, the moveable IP management function 730 itself may identify a need to allocate a moveable IP. At step S720, the moveable IP management function 730 may call the public cloud API 740 to allocate an IP to the Public Cloud VM/Host where the Forwarder 1 760 stays. At step S725, the moveable IP management function 730 may bind the IP address to the forwarder 1 760 and make the forwarder 1 760 use the IP address.

At step S730, steps S715 to S725 may be repeated for Forwarder 2 770 to allocate the secondary IP address of the SCTP multi-homing association. Please note that, in some embodiments, the step S730 may be performed at least partially in parallel with steps S715 to S725. In some embodiments, the step S730 may be performed in parallel with steps S715 to S725 completely.

At step S735, the RAN 750 may set up an SCTP association to the deployed AMF, that may comprise the forwarder 1 (or frontend) 760, the forwarder 2 (or frontend) 770, and one or more SCTP (or backends) 780. To be specific, a primary path of the SCTP association may be set up via the Forwarder 1 760 to the SCTP pod 780 at step S735a, and a secondary path of the same SCTP association may be set up via the Forwarder 2 770 to the SCTP pod 780 at step S735b.

At step S740, all RAN traffic destined to the AMF may go through the Forwarder 1 760 along the primary path, and the Forwarder 1 760 may forward the RAN traffic to the corresponding SCTP backend.

Referring to FIG. 8, at step S810a, the moveable IP management function 730 may perform a liveness detection of Forwarder 1. In some embodiments, the moveable IP management function 730 may detect the liveness of a forwarder directly or through the CaaS layer 720. At step S810b, the Forwarder 1 760 may be down, for example, due to the VM on which it stays is down. At step S810c, the moveable IP management function 730 may detect the failure of Forwarder 1 760.

In some embodiments, in parallel to the step S810b or S810c, the SCTP heartbeat mechanism in RAN 750 may eventually detect (e.g., in 6.4 second in one exemplary configuration) the primary path fails at step S820. In such a case, the RAN 750 may fall back to use the secondary path with the forwarder 2 770 for sending traffic. The RAN 750 may continuously monitor the IP address of the failed SCTP path by using the SCTP heartbeat mechanism. In some embodiments, this typically happens before the public cloud API call finishes relocating the IP to another available Forwarder as the call is slower than SCTP path fail-over. During this period, there is only one SCTP path available between the RAN 750 and the AMF. The SCTP association has no redundancy before it is recovered from the failure.

At step S830, the moveable IP management function 730 that owns the lifecycle of a moveable IP may decide where to relocate the IP. In the embodiment of FIG. 8, it may decide that the moveable IP shall be relocated to the forwarder 3 810.

At step S840, the moveable IP management function 730 may call the public cloud API 740 to de-allocate the IP from the Public Cloud VM/Host where the Forwarder 1 760 stays and allocate the same IP to the Cloud VM/Host where the Forwarder 3 810 stays.

At step S850, the moveable IP management function 730 may configure the IP address to the Forwarder 3 810 and make it use the IP address.

At step S860, the SCTP heartbeat from RAN 750 may succeed as the IP address is restored at the Forwarder 3 810, which make it possible to reach the SCTP endpoint with the original IP address. The SCTP association between the RAN 750 and the AMF restores its path redundancy.

Please note that these procedures may also work for other interfaces which do not has multiple homing support, such as GTP based interface in 5GC under that condition that the cloud API to relocate the moveable IP can be finished within acceptable interval required by the SLA agreement.

With the above procedures, no additional overlay network or tunnelling is required, and therefore no capacity loss is caused by the overlay network or tunnelling. Further, no CaaS IP table is used for load balancing and therefore worker node performance is also improved. Furthermore, the procedure may be applicable to all types of public clouds.

FIG. 9 is a flow chart of an exemplary method 900 at a network node for IP address management in a network, which is not capable to perform load balance with L3 or below information only, according to an embodiment of the present disclosure. The method 900 may be performed at a network node (e.g., the AMF 110). The method 900 may comprise step S910 and S920. However, the present disclosure is not limited thereto. In some other embodiments, the method 900 may comprise more steps, less steps, different steps, or any combination thereof. Further the steps of the method 900 may be performed in a different order than that described herein when multiple steps are involved. Further, in some embodiments, a step in the method 900 may be split into multiple sub-steps and performed by different entities, and/or multiple steps in the method 900 may be combined into a single step.

The method 900 may begin at step S910 where whether a second network node, to which a first IP address is allocated, fails to function or not may be determined.

At step S920, in response to determining that the second network node fails to function, the first IP address may be de-allocated from the second network node and the first IP address may be allocated to a third network node, such that a fourth network node may be enabled to route data, which is intended to be routed to the first IP address, to the third network node rather than the second network node.

In some embodiments, the step S910 may comprise: performing a liveness detection of the second network node directly or through an API server. In some embodiments, before the step of allocating the first IP address to the third network node, the method 900 may further comprise: determining the third network node as the network node to which the first IP address is to be relocated. In some embodiments, the step of de-allocating the first IP address from the second network node may comprise: invoking an API of the network to de-allocate the first IP address from a VM or host of the network at which the first IP address is hosted. In some embodiments, the step of allocating the first IP address to the third network node may comprise: invoking the API of the network to allocate the first IP address to a VM or host of the network at which the third network node is hosted, such that traffic can be routed to the third network node using the first IP address.

In some embodiments, after the step of allocating the first IP address to the third network node, the method 900 may further comprise: transmitting, to the third network node, a message instructing the third network node to provide a routing service at the first IP address. In some embodiments, before the step S910, the method 900 may further comprise: determining that an IP address is to be allocated at least partially based on a local configuration. In some embodiments, before the step S910, the method 900 may further comprise: invoking the API of the network to allocate the first IP address to a VM or host of the network at which the second network node is hosted in response to determining that an IP address is to be allocated. In some embodiments, before the step S910, the method 900 may further comprise: transmitting, to the second network node, a message instructing the second network node to provide a routing service at the first IP address.

In some embodiments, the method 900 may further comprise: invoking the API of the network to allocate a second IP address different from the first IP address to a VM or host of the network at which a fifth network node is hosted in response to determining that an IP address is to be allocated. In some embodiments, the method 900 may further comprise: transmitting, to the fifth network node, a message instructing the fifth network node to provide a routing service at the second IP address. In some embodiments, a multi-homing connection may comprise a first path and a second path at least, wherein data delivered over the first path is routed via the first IP address, and data delivered over the second path is routed via the second IP address. In some embodiments, the multi-homing connection may comprise an SCTP association. In some embodiments, the first path may be a primary path of the SCTP association, and the second path may be a secondary path of the SCTP association.

In some embodiments, the SCTP association may further comprise one or more other paths than the first path and the second path for data delivery. In some embodiments, the second network node, the third network node, and/or the fifth network node may be hosted by the network. In some embodiments, any two of the second network node, the third network node, and the fifth network node may be hosted at separate physical devices. In some embodiments, each of the second network node, the third network node, and the fifth network node may be a frontend entity that forwards data to at least one of one or more backend entities in a load balancing manner. In some embodiments, the one or more backend entities and the frontend entities may be deployed as a part of one or more network entities. In some embodiments, the network entities may comprise at least one of: one or more 5GC network functions, one or more EPC network elements, one or more RAN nodes; one or more OAM nodes; and one or more testing network functions. In some embodiments, the network entities may comprise an AMF, and the data may come from one or more RAN nodes.

In some embodiments, each of the frontend entities may be an SCTP load balancer, and each of the backend entities may be an SCTP endpoint that terminates one or more SCTP associations with one or more RAN nodes. In some embodiments, the network may be a public cloud.

FIG. 10 schematically shows an embodiment of an arrangement 1000 which may be used in a network node (e.g., the AMF 110) according to an embodiment of the present disclosure. Comprised in the arrangement 1000 are a processing unit 1006, e.g., with a Digital Signal Processor (DSP) or a Central Processing Unit (CPU). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity or as separate entities.

Furthermore, the arrangement 1000 may comprise at least one computer program product 1008 in the form of a non-volatile or volatile memory, e.g., an Electrically Erasable Programmable Read-Only Memory (EEPROM), a flash memory and/or a hard drive. The computer program product 1008 comprises a computer program 1010, which comprises code/computer readable instructions, which when executed by the processing unit 1006 in the arrangement 1000 causes the arrangement 1000 and/or the network node in which it is comprised to perform the actions, e.g., of the procedure described earlier in conjunction with FIG. 6 to FIG. 9 or any other variant.

The computer program 1010 may be configured as a computer program code structured in computer program modules 1010A and 1010B. Hence, in an exemplifying embodiment when the arrangement 1000 is used in a network node, the code in the computer program of the arrangement 1000 includes: a module 1010A for determining whether a second network node, to which a first IP address is allocated, fails to function or not; and a module 1010B for, in response to determining that the second network node fails to function, de-allocating the first IP address from the second network node; and allocating the first IP address to a third network node, such that a fourth network node is enabled to route data, which is intended to be routed to the first IP address, to the third network node rather than the second network node.

The computer program modules could essentially perform the actions of the flow illustrated in FIG. 6 to FIG. 9, to emulate the network node. In other words, when the different computer program modules are executed in the processing unit 1006, they may correspond to different modules in the network node.

Although the code means in the embodiments disclosed above in conjunction with FIG. 10 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the network node.

Correspondingly to the method 900 as described above, a network node is provided. FIG. 11 is a block diagram of an exemplary network node 1100 according to an embodiment of the present disclosure. The network node 1100 may be, e.g., the AMF 110 in some embodiments.

The network node 1100 may be configured to perform the method 900 as described above in connection with FIG. 9. As shown in FIG. 11, the network node 1100 may comprise a determining module 1110 for determining whether a second network node, to which a first IP address is allocated, fails to function or not; and an IP reallocation module 1120 for, in response to determining that the second network node fails to function, de-allocating the first IP address from the second network node; and allocating the first IP address to a third network node, such that a fourth network node is enabled to route data, which is intended to be routed to the first IP address, to the third network node rather than the second network node.

The above modules 1110 and 1120 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 9. Further, the network node 1100 may comprise one or more further modules, each of which may perform any of the steps of the method 900 described with reference to FIG. 9.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method at a first network node for Internet Protocol (IP) address management in a network that is not capable to perform load balance with Layer 3 or below information only, the method comprising:
   determining whether a second network node, to which a first IP address is allocated, fails to function or not; and
   in response to determining that the second network node fails to function:
      de-allocating the first IP address from the second network node; and
      allocating the first IP address to a third network node, such that a fourth network node is enabled to route data, which is intended to be routed to the first IP address, to the third network node rather than the second network node.

2. The method of claim 1, wherein the step of determining whether the second network node fails to function or not comprises:
   performing a liveness detection of the second network node directly or through an Application Programming Interface (API) server.

3. The method of claim 1, wherein before the step of allocating the first IP address to the third network node, the method further comprises:
   determining the third network node as the network node to which the first IP address is to be relocated.

4. The method of claim 1, wherein the step of de-allocating the first IP address from the second network node comprises:
   invoking an API of the network to de-allocate the first IP address from a virtual machine (VM) or host of the network at which the first IP address is hosted.

5. The method of claim 1, wherein the step of allocating the first IP address to the third network node comprises:
   invoking the API of the network to allocate the first IP address to a VM or host of the network at which the third network node is hosted, such that traffic can be routed to the third network node using the first IP address.

6. The method of claim 1, wherein after the step of allocating the first IP address to the third network node, the method further comprises:
   transmitting, to the third network node, a message instructing the third network node to provide a routing service at the first IP address.

7. The method of claim 1, wherein before the step of determining whether the second network node fails to function or not, the method further comprises:
   determining that an IP address is to be allocated at least partially based on a local configuration.

8. The method of claim 7, wherein before the step of determining whether the second network node fails to function or not, the method further comprises:
   invoking the API of the network to allocate the first IP address to a VM or host of the network at which the second network node is hosted in response to determining that an IP address is to be allocated.

9. The method of claim 8, wherein before the step of determining whether the second network node fails to function or not, the method further comprises:
   transmitting, to the second network node, a message instructing the second network node to provide a routing service at the first IP address.

10. The method of claim 7, further comprising:
    invoking the API of the network to allocate a second IP address different from the first IP address to a VM or host of the network at which a fifth network node is hosted in response to determining that an IP address is to be allocated.

11. The method of claim 10, further comprising:
    transmitting, to the fifth network node, a message instructing the fifth network node to provide a routing service at the second IP address.

12. The method of claim 10, wherein a multi-homing connection comprises a first path and a second path at least,
    wherein data delivered over the first path is routed via the first IP address, and data delivered over the second path is routed via the second IP address; and/or
    wherein the multi-homing connection comprises a Stream Control Transmission Protocol (SCTP) association.

13. The method of claim 12, wherein the first path is a primary path of the SCTP association, and the second path is a secondary path of the SCTP association; and/or wherein the SCTP association further comprises one or more other paths than the first path and the second path for data delivery.

14. The method of claim 10, wherein the second network node, the third network node, and/or the fifth network node are hosted by the network; and/or wherein any two of the second network node, the third network node, and the fifth network node are hosted at separate physical devices.

15. The method of claim 10, wherein each of the second network node, the third network node, and the fifth network node is a frontend entity that forwards data to at least one of one or more backend entities in a load balancing manner; and/or wherein the one or more backend entities and the frontend entities are deployed as a part of one or more network entities.

16. The method of claim 15, wherein the network entities comprise at least one of:

one or more 5G Core (5GC) network functions;

one or more Evolved Packet Core (EPC) network elements;

one or more Radio Access Network (RAN) nodes;

one or more Operation & Administration Maintenance (OAM) nodes;

one or more testing network functions.

17. The method of claim 16, wherein the network entities comprise an Access & Mobility Management Function (AMF), and the data comes from one or more RAN nodes.

18. The method of claim 15, wherein each of the frontend entities is an SCTP load balancer, and each of the backend entities is an SCTP endpoint that terminates one or more SCTP associations with one or more RAN nodes; and/or wherein the network is a public cloud.

19. A network node, comprising:

a processor; and a memory storing instructions which, when executed by the processor, cause the processor to perform:

determining whether a second network node, to which a first IP address is allocated, fails to function or not; and in response to determining that the second network node fails to function:

de-allocating the first IP address from the second network node; and allocating the first IP address to a third network node, such that a fourth network node is enabled to route data, which is intended to be routed to the first IP address, to the third network node rather than the second network node.

* * * * *